United States Patent
Cudich

(10) Patent No.: US 9,953,093 B1
(45) Date of Patent: Apr. 24, 2018

(54) MAPPING SYSTEM FOR A BROWSER HISTORY STACK AND A BROWSER PAGE STATE

(75) Inventor: Matias Cudich, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 1034 days.

(21) Appl. No.: 13/603,250

(22) Filed: Sep. 4, 2012

(51) Int. Cl.
  *G06F 17/00* (2006.01)
  *G06F 17/30* (2006.01)
(52) U.S. Cl.
  CPC .. *G06F 17/30876* (2013.01); *G06F 17/30896* (2013.01)
(58) Field of Classification Search
  CPC ............. G06F 17/30876; G06F 17/30896
  See application file for complete search history.

(56) References Cited

U.S. PATENT DOCUMENTS

| | | | |
|---|---|---|---|
| 7,617,458 B1* | 11/2009 | Wassom et al. | 715/760 |
| 8,396,920 B1* | 3/2013 | Pupius et al. | 709/203 |
| 2009/0119675 A1* | 5/2009 | Higgins et al. | 719/311 |
| 2010/0005053 A1* | 1/2010 | Estes | G06F 17/30876 707/E17.001 |
| 2012/0180073 A1* | 7/2012 | Hung | G06F 17/30887 719/313 |

OTHER PUBLICATIONS

Pushing and Popping with the History API, by Mike Robinson, Nov. 15, 2011. Retrieved from http://html5doctor.com/history-api on Aug. 10, 2015.*

* cited by examiner

*Primary Examiner* — Scott Baderman
*Assistant Examiner* — Barbara Level
(74) *Attorney, Agent, or Firm* — Lowenstein Sandler LLP

(57) ABSTRACT

A system and method for mapping changes between a browser history stack and a browser page state using one or more tokens. The system comprises an updater module, a parsing module, a mapping module and an execution module. The updater module receives a navigation request from the user and updates a browser history stack based at least in part on the navigation request The parsing module receives a token associated with an entry at the top of the browser history stack and parsing the token into one or more dynamic segments. The mapping module receives the one or more dynamic segments and generates a map based at least in part on the one or more dynamic segments. The execution module receives the map and executing code based at least in part on the map.

15 Claims, 7 Drawing Sheets

500A

| Dynamic Segment 502 | Type 504 |
|---|---|
| "account" 506 | Controller 508 |
| ⋮ | ⋮ |
| "list" 510 | Action 512 |
| ⋮ | ⋮ |
| adservers 514 | Identifier 516 |

500B

| If dynamic segment(s): 542 | Then: 544 |
|---|---|
| "account" AND "adservers" AND "list" 546 | Execute code to display list of adserver accounts 548 |
| "account" AND "user" AND "view" 550 | Execute code to display the user account 552 |
| ⋮ | ⋮ |

500A

| Dynamic Segment 502 | Type 504 |
|---|---|
| "account" 506 | Controller 508 |
| ⋮ | ⋮ |
| "list" 510 | Action 512 |
| ⋮ | ⋮ |
| adservers 514 | Identifier 516 |

| If dynamic segment(s): 542 | Then: 544 |
|---|---|
| "account" AND "adservers" AND "list" 546 | Execute code to display list of adserver accounts 548 |
| "account" AND "user" AND "view" 550 | Execute code to display the user account 552 |
| ⋮ | ⋮ |

Figure 5B

MAPPING SYSTEM FOR A BROWSER HISTORY STACK AND A BROWSER PAGE STATE

BACKGROUND

The specification relates to a system for mapping changes between a browser history stack and a browser page state. In particular, the specification relates to a mapping system for mapping changes between a browser history stack and a browser page state using one or more tokens.

Browser-based applications are not uncommon on networks. In a browser-based application, the user is not necessarily transferred to another page (e.g., a different URL) when the user interacts with the page (e.g., clicks on a link). The user may remain at the current page (i.e., same URL), which is modified to display a different page state (e.g., the page state associated with the link). Because the user changes page states and not pages, routing problems are created. For example, a user desiring to see a previous page state cannot use the browser's back button because that would bring the user to the previous page (i.e., URL) in the browser history stack and not the previous page state.

Existing development toolkit systems contain a mechanism for pushing events into the browser history stack and monitoring for and acting upon changes to the browser history stack. However, there is no canonical system for mapping changes in the browser history stack to the execution of the browser-based application code. The lack of a canonical system has led to developers creating many different implementations to accomplish the same thing. This is not ideal. The different implementations may not be rigorously tested and therefore prone to failure. Moreover, the different implementations may be application specific requiring a developer to create a new implementation for each new application, which may be time consuming and expensive.

A problem present in existing systems is that there is no canonical, well-tested and highly flexible method for mapping changes between a browser-based application's page state and changes in a browser history stack.

SUMMARY

The specification overcomes the deficiencies and limitations of the prior art at least in part by providing a system and method for mapping changes between a browser history stack and a browser page state using one or more tokens. A routing module comprises an updater module, a parsing module, a mapping module and an execution module. The updater module receives a navigation request from the user and updates a browser history stack based at least in part on the navigation request. The parsing module receives a token associated with an entry at the top of the browser history stack and parsing the token into one or more dynamic segments. The mapping module receives the one or more dynamic segments and generates a map based at least in part on the one or more dynamic segments. The execution module receives the map and executing code based at least in part on the map.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

FIG. 5A is an example of a table of dynamic segments and associated information according to one embodiment.

FIG. 5B is an example of a table used by a combined module according to one embodiment.

DETAILED DESCRIPTION

Figure 1:
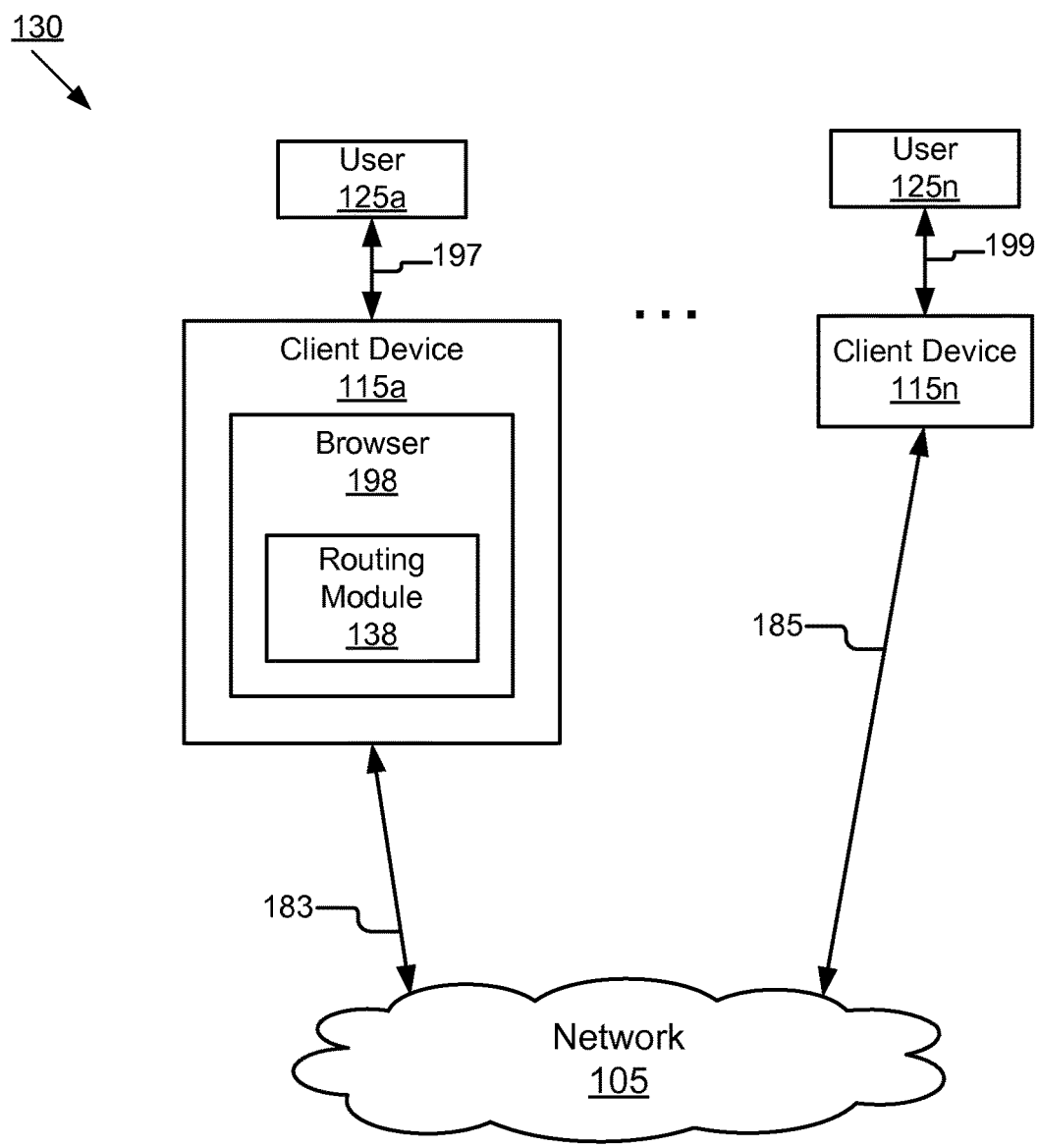
FIG. 1 is a high-level block diagram illustrating a system for mapping changes between a browser history stack and a browser page state using one or more tokens according to one embodiment.

A system and method for mapping changes between a browser history stack and a browser page state using one or more tokens is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable storage medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

Finally, embodiments described herein include collection of data describing a user and/or activities of users. In one embodiment, such data is only collected upon the user providing consent to the collection of this data. In some implementations, a user is prompted to explicitly allow data collection. Further, the user may opt-in or opt-out of participating in such data collection activities. In one embodiment, the collected data is anonymized prior to performing any analysis to obtain any statistical patterns so that the identity of the user cannot be determined from the collected data.

System Overview

FIG. 1 illustrates a block diagram of a system 130 for mapping changes between a browser history stack and a browser page state using one or more tokens according to one embodiment. The illustrated embodiment of the system 130 includes client devices 115a, 115n (also referred to collectively or individually as client devices 115) that are accessed by users 125a, 125n (also referred to collectively or individually as users 125). In the illustrated embodiment, these entities are communicatively coupled via a network 105. For example, the client devices 115 are communicatively coupled to one another via a network 105 to facilitate sharing of information (e.g., video content file) between users 125 of client devices 115.

Although two client devices 115 are illustrated in FIG. 1, persons having ordinary skill in the art will recognize that any number of client devices 115 can be communicatively coupled to the network 105. Furthermore, while one network 105 is coupled to the client devices 115, persons having ordinary skill in the art will appreciate that any number of networks 105 can be connected to the client devices 115.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, e-mail, etc. In yet another embodiment, all or some of the links in the network 105 are encrypted using conventional encryption technologies such as secure sockets layer (SSL), secure HTTP and/or virtual private networks (VPNs).

In the illustrated embodiment, the client device 115a is coupled to the network 105 via signal line 183. The user 125a interacts with the client device 115a as represented by signal line 197. Client device 115n and user 125n are coupled and interact in a similar manner. The client device 115n is coupled to the network 105 via signal line 185. The user 125n interacts with the client device 115n as represented by signal line 199.

The client device 115 is any computing device. For example, the client device 115 is a personal computer ("PC"), smart phone, tablet computer (or tablet PC), etc. One having ordinary skill in the art will recognize that other types of client devices 115 are possible. In one embodiment, the system 130 comprises a combination of different types of client devices 115. For example, a plurality of other client devices 115 is any combination of a personal computer, a smart phone and a tablet computer.

The client device 115 comprises a browser 198. In one embodiment, the browser 198 is code and routines stored in a memory (not pictured) of the client device 115 and executed by a processor (not pictured) of the client device 115. For example, the browser 198 is a browser application such as Google Chrome.

The browser 198 is capable of displaying a page state based at least in part on browser-based application code. The browser based application code is code for an application that is hosted in the browser 198. In one embodiment, the browser-based application code is written in a browser 198 supported language (e.g., JavaScript) and reliant upon the browser 198 to render the application executable. A person having ordinary skill in the art will recognize JavaScript is just one example of a browser supported language and other browser supported languages exist.

Figure 3:
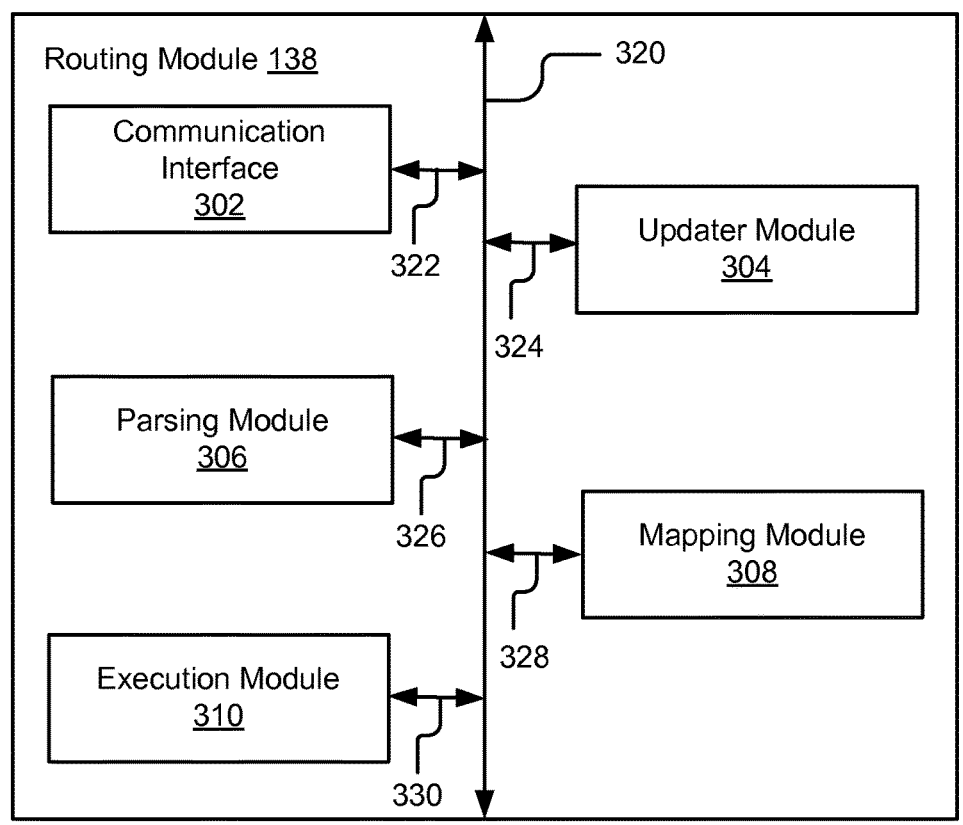
FIG. 3 is a block diagram illustrating a routing module according to one embodiment.

In one embodiment, the browser 198 comprises a routing module 138, which is discussed further in reference to FIG. 3. Although a browser 198, interface creator module 138 is shown in reference to client device 115a, a person having ordinary skill in the art will recognize that any client device 115 may comprise these elements. The user 125 is a human user of the client device 115.

Client Device 115

Figure 2:
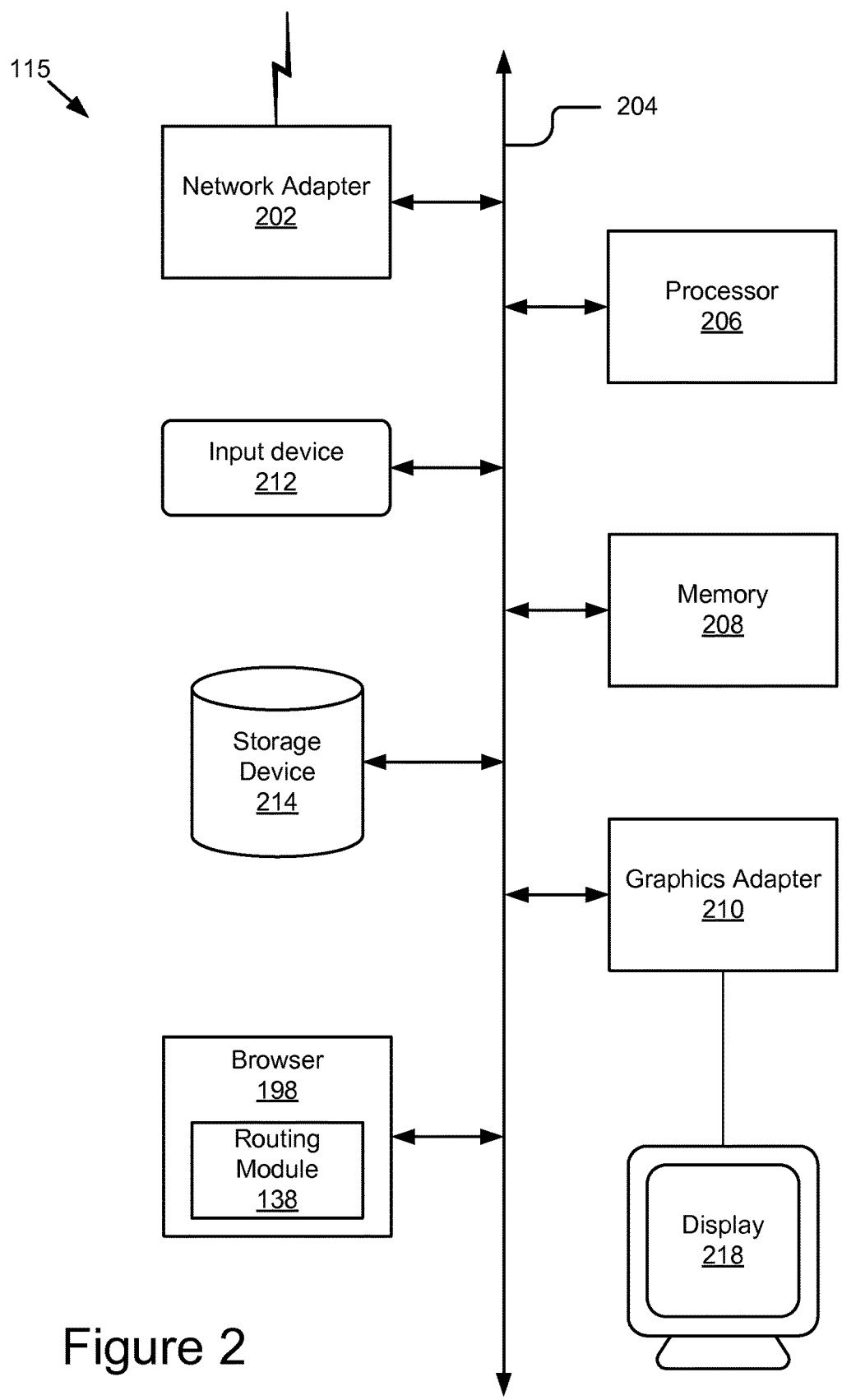
FIG. 2 is a block diagram illustrating a client device according to one embodiment.

FIG. 2 is a block diagram of an embodiment of a client device 115 according to one embodiment. As illustrated in FIG. 2, the client device 115 includes a network adapter 202 coupled to a bus 204. According to one embodiment, also coupled to the bus 204 are at least one processor 206, memory 208, a graphics adapter 210, an input device 212, a storage device 214 and a browser 198. A routing module 138 is included in the browser 198. In one embodiment, the functionality of the bus 204 is provided by an interconnecting chipset. The client device 115 also includes a display 218, which is coupled to the graphics adapter 210.

The processor 206 may be any general-purpose processor. The processor 206 comprises an arithmetic logic unit, a microprocessor, a general purpose controller or some other processor array to perform computations and execute code and routines. The processor 206 is coupled to the bus 204 for communication with the other components of the client device 115. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. The client device 115 also includes an operating system executable by the processor such as but not limited to WINDOWS®, MacOS X, Android or UNIX® based operating systems. It will be obvious to one skilled in the art that other processors, operating systems, sensors, displays and physical configurations are possible.

The memory is a non-transitory storage medium. The memory 208 holds instructions and/or data that may be executed by the processor 206. In one embodiment, the instructions and/or data stored on the memory 208 comprise code for performing any and/or all of the techniques described herein. The memory 208 may be a dynamic random access memory (DRAM) device, a static random access memory (SRAM) device, flash memory or some other memory device known in the art. In one embodiment, the memory 208 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the client device 115. In one embodiment, the routing module 138 is stored in memory 208 and executable by the processor 206.

The storage device 214 is a non-transitory memory device capable of holding data, like a hard drive, compact disk read-only memory (CD-ROM), DVD, or a solid-state memory device. In one embodiment, the storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the storage device 214 stores data and information used by the routing module 138, its submodules and other data necessary to perform the functionality described below.

The input device 212 may include a mouse, track ball, or other type of pointing device to input data into the client device 115. The input device 212 may also include a keyboard, such as a QWERTY keyboard or any other physical or soft keyboard. The input device 212 may also include a microphone, a web camera or similar audio or video capture device. The graphics adapter 210 displays images and other information on the display 218. The display 218 is a conventional type such as a liquid crystal display (LCD) or any other similarly equipped display device, screen, touchscreen, or monitor. The display 218 represents any device equipped to display electronic images and data as described herein. The network adapter 202 couples the client device 115 to a local or wide area network (e.g., network 105).

The routing module 138 is code and routines executable by the processor 206 to map changes between a browser history stack and a browser page state using one or more tokens. In one embodiment, the routing module 138 is a set of instructions executable by the processor 206. In another embodiment, the routing module 138 is stored in the memory 208 and is accessible and executable by the processor 206. Details describing the functionality and components of the routing module 138 are explained in further detail below in reference to FIG. 3.

As is known in the art, a client device 115 can have different and/or other components than those shown in FIG. 2. In addition, the client device 115 can lack certain illustrated components. Moreover, the storage device 214 can be local and/or remote from the client device 115 (such as embodied within a storage area network (SAN)).

As is known in the art, the client device 115 is adapted to execute computer program modules for providing the functionality described herein. As used herein, the term "module" refers to computer program logic utilized to provide the specified functionality. Thus, a module can be implemented in hardware, firmware and/or software. In one embodiment, program modules are stored on the storage device 214, loaded into the memory 208 and executed by the processor 206.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Routing Module 138

Referring now to FIG. 3, depicted is an embodiment of a routing module 138 in more detail. Specifically, FIG. 3 depicts a block diagram of the routing module 138 included in the browser 198 of the client device 115.

In one embodiment, the routing module 138 comprises a communication interface 302, an updater module 304, a parsing module 306, a mapping module 308 and an execution module 310.

The communication interface 302 includes code and routines used by the client device 115 for handling communications between the updater module 304, the parsing module 306, the mapping module 308, the execution module 310 and the other components of the client device 115. In one embodiment, the communication interface 302 is a set of instructions executable by the processor 206. In another embodiment, the communication interface 302 is stored in the memory 208 and is accessible and executable by the processor 206. In either embodiment, the communication interface 302 is adapted for cooperation and communication with the processor 206 and other components of the client device 115 via signal line 320. The communication interface 302 is communicatively coupled to signal line 320 via signal line 322.

The communication interface 302 handles communications between the updater module 304, the parsing module 306, the mapping module 308, the execution module 310 and the other components of the client device 115. For example, in one embodiment, the communication interface 302 communicates with the parsing module 306 and the mapping module 308 to pass one or more dynamic segments from the parsing module 306 to the mapping module 308. However, this description may occasionally omit mention of the communication interface 302 for purposes of clarity and convenience. For example, for purposes of clarity and convenience, the above scenario may be described as the parsing module 306 passing one or more dynamic segments to the mapping module 308.

The updater module 304 includes code and routines for receiving a navigation request and updating the browser history stack based at least in part on the navigation request. In one embodiment, the updater module 304 is a set of instructions executable by the processor 206. In another embodiment, the updater module 304 is stored in the memory 208 and is accessible and executable by the processor 206. In either embodiment, the updater module 304 is adapted for cooperation and communication with the processor 206 and other components of the client device 115 via signal line 320. The updater module 304 is communicatively coupled to signal line 320 via signal line 324.

The updater module 304 receives a navigation request. In one embodiment, the navigation request comprises a string path. A string path comprises one or more of a command and a pathname that when the path associated with the pathname is followed and/or the command executed results in the display of a page state. For example, "account/adservers/list" is a string path comprising both a pathname (i.e., account/adservers) and a command (i.e., list). The path is followed (i.e., account to adservers) and the command (i.e., list) at the end of the path (i.e., the list command under the adservers block of code) is executed to display a page state listing of adserver accounts. Assume a user 125 generates a navigation request by clicking on a link comprising the string path "account/adservers/list;" in one embodiment, the updater module 304 receives the string path "account/adservers/list." A person having ordinary skill in the art will recognize that the above is just one example of a string path and other examples exist. Moreover, a person having ordinary skill in the art will recognize that a link comprising a string path is just one example of a navigation request and that other navigation requests exist.

The updater module 304, upon receipt of the navigation request, updates the browser history stack based at least in part on the navigation request. The browser history stack is a stack comprising one or more entries each associated with a page or a page state displayed by the browser 198. In one embodiment, the updater module 304 updates the browser history stack by generating a new entry in the browser history stack. In one such embodiment, the entry comprises one or more of the URL and a token associated with a page state of a browser-based application. In one embodiment, the token is a hash token. For example, the token is preceded by a hash ("#") separating the URL from the token. A person having ordinary skill in the art will recognize that a hash token is just one example of a token and other tokens exist.

Figure 4:
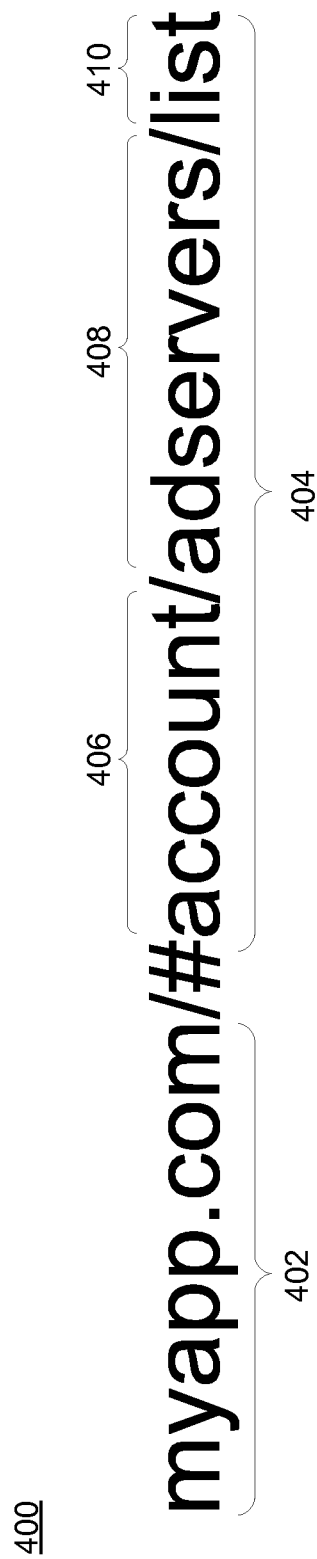
FIG. 4 is an example of an entry into a browser history stack according to one embodiment.

FIG. 4 illustrates an example of an entry 400 into the browser history stack according to one embodiment. In the illustrated embodiment, the entry comprises the uniform resource locator ("URL") 402 and a hash token 404. The token 404 is based at least in part on the navigation request. In one embodiment, the token is identical to the string path. For example, updater module 304 receives a navigation request comprising the string path "account/adservers/list" and the URL 402 is updated with the token "account/adservers/list" 404 to create an entry 400 in the browser history stack. A person having ordinary skill in the art will recognize that the above is just one example of a token and other tokens exist.

In another embodiment, the navigation request is associated with an entry in the browser history stack. For example, assume the user 125 generates a navigation request by selecting the "back button" of the browser 198 to return to the previous page state, which is associated with entry 400 of the browser history stack, the updater module 304 updates the browser history stack so that entry 400 is at the top of the browser history stack. A person having ordinary skill in the art will recognize that using a "back button" is just one example of a navigation request associated with an entry in the browser history stack and that other examples exist.

Referring again to FIG. 3, in one embodiment, the updater module 304 passes the token of the entry at the top of the browser history stack to the parsing module 306. For example, the updater module 304 is communicatively coupled to the parsing module 306 to send the token to the parsing module 306. In another embodiment, the updater module 304 (or the communication interface 302) stores the entry and/or the browser history stack in the storage device 214 (or any other non-transitory storage medium communicatively accessible). The other engines of the routing module 138, e.g., the parsing module 306 can retrieve one or more of the entry, token and browser history stack by accessing the storage device 214 (or other non-transitory storage medium).

The parsing module 306 includes code and routines for parsing the token. In one embodiment, the parsing module 306 is a set of instructions executable by the processor 206. In another embodiment, the parsing module 306 is stored in the memory 208 and is accessible and executable by the processor 206. In either embodiment, the parsing module 306 is adapted for cooperation and communication with the processor 206 and other components of the client device 115 via signal line 320. The parsing module 306 is communicatively coupled to signal line 320 via signal line 326.

The parsing module 306 parses the token. In one embodiment, the parsing module receives an entry from the updater module 304 or, depending upon the embodiment, retrieves the entry from the storage device 214 (or any other non-transitory storage medium communicatively accessible) and parses the URL from the token. In another embodiment, the parsing module receives or retrieves only the token. In either embodiment, the parsing module 306 parses the token.

The parsing module 306 parses the token into one or more dynamic segments. A dynamic segment is a portion of the token that is mapped. In one embodiment, the token is parsed into one or more dynamic segments based at least in part on syntax. Syntax is a set of rules that defines a structure for a combination of symbols and/or characters. For example, referring again to FIG. 4, assume the parsing module 306 parses the token 404 based at least in part on a syntax where a hash ("#") separates the token 404 from the URL and slashes ("/") are delimiters between dynamic segments of the token 404, the parsing module 306 parses the entry 400 into a first dynamic segment 406 (i.e., "account"), a second dynamic segment 408 (i.e., "adservers") and a third dynamic segment (i.e., "list"). A person having ordinary skill in the art will recognize that these are examples of a syntax, a delimiter and dynamic segments and that other syntaxes, delimiters and dynamic segments exist. Moreover, a person having ordinary skill in the art will recognize that this is just one example of parsing and that other examples of parsing exist.

Referring again to FIG. 3, in one embodiment, the parsing module 306 passes the one or more dynamic segments to the mapping module 308. For example, the parsing module 306 is communicatively coupled to the mapping module 308 to send the one or more dynamic segments to the mapping module 308. In another embodiment, the parsing module 306 (or the communication interface 302) stores the one or more dynamic segments in the storage device 214 (or any other non-transitory storage medium communicatively accessible). The other engines of the routing module 138, e.g., the mapping module 308 can retrieve the one or more dynamic segments by accessing the storage device 214 (or other non-transitory storage medium). In one embodiment, the order of the dynamic segments within the token is preserved. For example, the parsing module 306 indexes the dynamic segments in the storage device 214 or passes the dynamic segments in order to the mapping module 308.

The mapping module 308 includes code and routines for generating a map based at least in part on the one or more dynamic segments, i.e., the mapping module 308 "maps" the one or more dynamic segments. In one embodiment, the mapping module 308 is a set of instructions executable by the processor 206. In another embodiment, the mapping module 308 is stored in the memory 208 and is accessible and executable by the processor 206. In either embodiment, the mapping module 308 is adapted for cooperation and communication with the processor 206 and other components of the client device 115 via signal line 320. The mapping module 308 is communicatively coupled to signal line 320 via signal line 328.

The mapping module 308 maps the dynamic segments based at least in part on priority. In one embodiment, the mapping module 308 maps higher priority dynamic segments before lower priority. In one embodiment, priority is based at least in part on the structure of the browser-based application code. For example, assume the dynamic segments "account," "adservers" and "list" refer to a class, sub-class and action in the sub-class, respectively, the mapping module 308 maps the controller class "account" before the sub-class "adservers," which contains a "list" action.

In another embodiment, priority is based at least in part on the logical order of execution. For example, the mapping module 308 maps a "list" command before a "sort" command because a list must be created before the list can be sorted. In one embodiment, the mapping module 308 compares the dynamic segments to a table or list of dynamic segments and each dynamic segment's associated priority and maps the dynamic segments based at least in part on the order of priority.

FIG. 5A is an example of a table of dynamic segments and associated information according to one embodiment. In the illustrated embodiment, the mapping module 308 receives the dynamic segments "account" 406, "adservers" 408 and "list" 410 from the parsing module 306. The mapping module 308 compares each dynamic segment 406, 408, 410 received to the dynamic segments in column 502 of table 500A and identifies a matching entry 506, 510, 514 for each dynamic segment received 406, 408, 410, respectively.

In the illustrated embodiment, each dynamic segment 502 is associated with a type in column 504 that determines at least in part the priority of the dynamic segment 502. For example, the relative priority of the types shown from highest to lowest is controller, action and identifier. The mapping module 308 maps the dynamic segments in the order "account" (controller), "list" (action) and "adservers" (identifier). A person having ordinary skill in the art will recognize controller, identifier and action are just examples of different types of dynamic segments and that other types exist. Moreover, a person having ordinary skill in the art will recognize that the priority associated with each dynamic segment type is just an example and that each dynamic segment type may be associated with another or different priority. Mapping dynamic segments or groups of dynamic segments based at least in part on priority beneficially enables fall-through execution of code by the executions module 310 discussed below.

In one embodiment, the mapping of dynamic segments is based at least in part on a pattern created by the one or more dynamic segments within the token. A pattern is a definition based at least in part on the combination of the one or more dynamic segments, for example, the pattern is based at least in part on one or more of the number of dynamic segments in the token, the order of dynamic segments in the token, the delimiter used between dynamic segments in the token, the dynamic segment itself, etc. For example, referring again to FIG. 4, the token 404 comprises three dynamic segment sections 406, 408 and 410. The mapping module 308 identifies a pattern defining that the first dynamic segment location 406 is a reference to a controller, the second dynamic segment location 408 is a reference to an identifier, and the third dynamic segment location 410 is a reference to an action when a token has three dynamic segments. The token 404 has three dynamic segments; therefore, the mapping module 308 maps the dynamic segments using the pattern (i.e., controller=account, action=list and identifier=adservers). A person having ordinary skill in the art will recognize that the above is just one example of a pattern and other patterns exist.

Referring again to FIG. 3, in one embodiment, the mapping module 308 passes the map to the execution module 310. For example, the mapping module 308 is communicatively coupled to the execution module 310 to send the map to the execution module 310. In another embodiment, the mapping module 308 (or the communication interface 302) stores the map in the storage device 214 (or any other non-transitory storage medium communicatively accessible). The other engines of the routing module 138, e.g., the execution module 310 can retrieve the map by accessing the storage device 214 (or other non-transitory storage medium).

The execution module 310 includes code and routines for executing code based at least in part on the map. In one embodiment, the mapping module 308 is a set of instructions executable by the processor 206. In another embodiment, the mapping module 308 is stored in the memory 208 and is accessible and executable by the processor 206. In either embodiment, the mapping module 308 is adapted for cooperation and communication with the processor 206 and other components of the client device 115 via signal line 320. The mapping module 308 is communicatively coupled to signal line 320 via signal line 328.

The execution module 310 executes browser-based application code based at least in part on the map. In one embodiment, the execution module 310 executes application code that alters the page state displayed by the browser 198 to the user 125 based at least in part on the map. For example, the execution module 310 first executes the highest priority code indicated by the map, e.g., the "account" controller block of code. In one embodiment, the execution module 310 allows for fall-through. For example, the execution module 310 executes the "account" controller code then falls-through to a block of toolbar code that, when executed by the execution module 310, displays a toolbar used to interact with account data. The execution module 310 then executes the next highest priority code indicated by the map, e.g., the "list" action code which retrieves and displays data associated with an identifier (e.g., "adservers"), thereby altering the page state of the browser 198 to display a toolbar and a list of adserver accounts.

In one embodiment, the names and/or headers of the browser-based application code (e.g., "account," "adservers" and "list") and the possible dynamic segments of a token identical. In one embodiment, the developer of the browser-based application defines the names and/or headers and writes the code associated with each name and/or header. For example, the developer determines the browser-based application will display account information, so the developer defines a controller titled "account." The developer determines different types of account information may be displayed, so the developer references and defines an "adservers" presenter and a "users" presenter associated with adserver accounts and user accounts, respectively. The developer then determines that each presenter will display data and information as a list, so the developer references and defines a "list" action to list the associated account data and information. The developer then associates the string path "account/adservers/list" with a "view a list of adserver accounts" button.

The system 130 beneficially enables the mapping of a change in the browser history stack based on a navigation request to be mapped to and trigger the execution of browser-based application code thereby changing the page state displayed to the user 125 in the browser 198. A person having ordinary skill in the art will recognize that the above is just one example of executing code based at least in part on a map and other examples exist. Moreover, a person having ordinary skill in the art will recognize that the above is just one example of fall-through and other examples of fall-through exist.

A person having ordinary skill in the art will recognize that the modules defined above are chosen for clarity and convenience. The functionality of the above modules may be divided into further modules or combined into fewer modules without departing from the teachings herein. For example, in one embodiment, the functionality of the mapping module 308 and execution module 310 may be combined into a single module referred to herein as a "combined module" (not shown). In one such embodiment, the combined module uses "if . . . then . . . " statements.

Referring now to FIG. 5B, an example of a table used by the combined module according to one embodiment. The combined module, receives the one or more dynamic segments from the parsing module 306. If the condition of column 542 is satisfied then the code of column 544 is executed. For example, in the illustrated embodiment, if the token comprises the dynamic segments "account," "adservers" and "list" the combined module executes code to display a list of adserver accounts. A person having ordinary skill in the art will recognize that the above is only an example of an "if . . . then . . . " statement and other examples exist.

Methods

Figure 6:
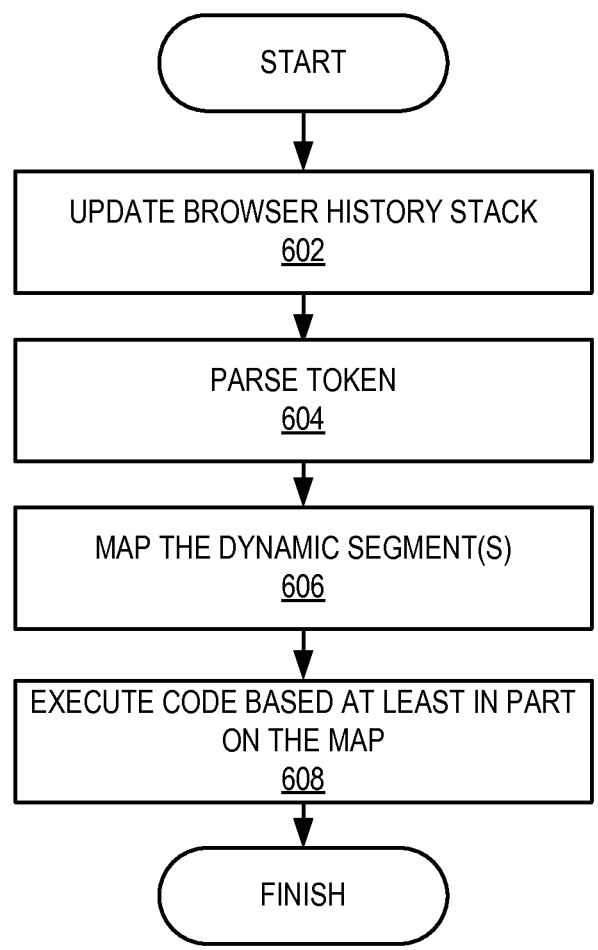
FIG. 6 is a flow diagram of a method for mapping changes between a browser history stack and a browser page state using one or more tokens according to one embodiment.
Figure 7:
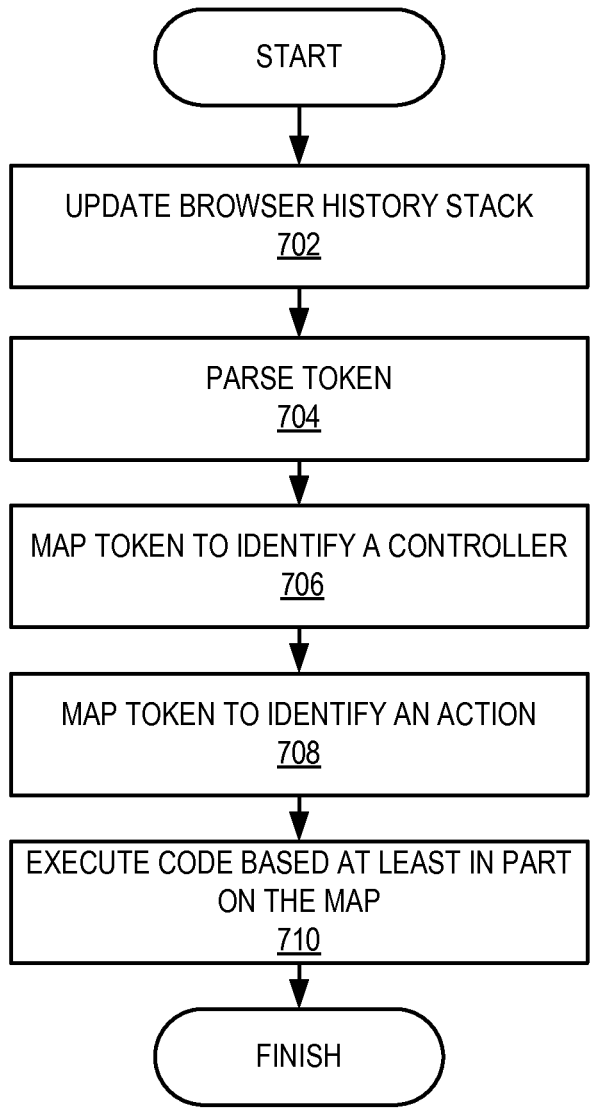
FIG. 7 is a flow diagram of another method for mapping changes between a browser history stack and a browser page state using one or more tokens according to one embodiment.

FIGS. 6-7 depict various methods performed by the system described above with reference to FIGS. 1-3.

FIG. 6 is a flow diagram depicting one embodiment of a method 600 for mapping changes between a browser history stack and a browser page state using one or more tokens. Assume a navigation request has been received from the user 125, for example, the user 125 has clicked a link to view a new page state or has clicked the "back button" of the browser 198 to return the prior page state. At step 602, the updater module 304 updates the browser history stack based at least in part on the received navigation request, for example, by generating a new entry or modifying the browser history stack. At step 604, the parsing module 306 parses the token of the entry at the top of the browser history stack into one or more dynamic segments. At step 606, the mapping module 308 maps the one or more dynamic segments based at least in part on one or more of the priority of the dynamic segment and a pattern. At step 608, the execution module 310 executes code based at least in part on the map.

FIG. 7 is a flow diagram depicting another embodiment of a method 700 for mapping changes between a browser history stack and a browser page state using one or more tokens. Again, assume a navigation request has been received from the user 125, for example, the user 125 has clicked a link to view a new page state or has clicked the "back button" of the browser 198 to return the prior page state. At step 702, the updater module 304 updates the browser history stack based at least in part on the navigation request, for example, by generating a new entry or modifying the browser history stack. At step 704, the parsing module 306 parses the token of the entry at the top of the browser history stack into one or more dynamic segments. At step 706, the mapping module 308 maps a controller associated with one or more dynamic segments. At step 708, the mapping module 308 maps an action associated with one or more dynamic segments. At step 710, the execution module 310 executes code based at least in part on the map, e.g., executing code associated with a controller before executing code associated with an action.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
    receiving, by a processing device executing a browser, a user navigation request via a page presented by the browser, the user navigation request to cause a changed page state of the browser to be presented to a user;
    updating, by a component within the browser and without executing browser-based application code, a browser history stack of the browser based at least in part on the navigation request, the browser history stack comprising a plurality of entries that each include a respective token associated with a corresponding page state of the browser, wherein the updating is not specific to the type of the browser-based application code; and
    causing a presentation of the changed page state of the browser based on the updated browser history stack, wherein causing the presentation of the changed page state of the browser comprises:
        parsing, by the component within the browser, a token from an entry at the top of the browser history stack into a plurality of dynamic segments;
        generating, by the component within the browser, a map based at least in part on the plurality of parsed dynamic segments, wherein the map is generated based on a structure of browser-based application code without executing the browser-based application code and is not specific to the type of the browser-based application code, and wherein generating the map comprises:
            accessing a data structure having a plurality of predefined dynamic segment types and corresponding priorities indicating an order of execution for blocks of the browser-based application code; and
            mapping the plurality of parsed dynamic segments using the plurality of predefined dynamic segment types and the corresponding priorities, to define the order of execution for the blocks of the browser-based application code; and
        executing, by the browser, the blocks of the browser-based application code based at least in part on the map to cause the presentation of the changed page state of the browser in view of the updated browser history stack.

2. The method of claim 1, wherein the navigation request comprises a string path and the token is identical to the string path.

3. The method of claim 1, wherein updating the browser history stack further comprises one or more of:
    pushing a new entry to the top of the browser history stack; or
    pulling an existing entry to the top of the browser history stack.

4. The method of claim 1, wherein the entry comprises a uniform resource locator and the token.

5. The method of claim 1, wherein the priorities are based at least in part on a structure of the browser-based application code.

6. A system comprising:
    a memory; and
    a processor, operatively coupled with the memory, to:
    receive, by the processor executing a browser, a user navigation request via a page presented by the browser, the user navigation request to cause a changed page state of the browser to be presented to a user;
    update, by a component within the browser and without executing browser-based application code, a browser history stack of the browser based at least in part on the navigation request, the browser history stack comprising a plurality of entries that each include a respective token associated with a corresponding page state of the browser, wherein the update is not specific to the type of the browser-based application code; and
    cause a presentation of the changed page state of the browser based on the updated browser history stack, wherein to cause the presentation of the changed page state of the browser, the processor is to:
        parse, by the component within the browser, a token from an entry at the top of the browser history stack into a plurality of dynamic segments;
        generate, by the component within the browser, a map based at least in part on the plurality of parsed dynamic segments, wherein the map is generated based on a structure of browser-based application code without executing the browser-based application code and is not specific to the type of the browser-based application code, and wherein to generate the map the processor is to:
  access a data structure having a plurality of predefined dynamic segment types and corresponding priorities indicating an order of execution for blocks of browser-based application code; and
  map the plurality of parsed dynamic segments using the plurality of predefined dynamic segment types and the corresponding priorities, to define the order of execution for the blocks of the browser-based application code; and
execute, by the browser, the blocks of the browser-based application code based at least in part on the map to cause the presentation of the changed page state of the browser in view of the updated browser history stack.

7. The system of claim 6, wherein the navigation request comprises a string path and the token is identical to the string path.

8. The system of claim 6, wherein to update the browser history stack, the processor further to perform one or more of pushing a new entry to the top of the browser history stack or pulling an existing entry to the top of the browser history stack.

9. The system of claim 6, wherein the entry comprises a uniform resource locator and the token.

10. The system of claim 6, wherein the priorities are further based at least in part on a structure of the browser-based application code.

11. A non-transitory computer readable medium comprising instructions that, when executed by a processor, cause the processor to:
  execute, by the processor, a browser;
  receive, by the browser, a user navigation request via a page presented by a browser, the user navigation request to cause a changed page state of the browser to be presented to a user;
  update, by a component within the browser and without executing browser-based application code, a browser history stack of the browser based at least in part on the navigation request, the browser history stack comprising a plurality of entries that each include a respective token associated with a corresponding page state of the browser, wherein the update is not specific to the type of the browser-based application code; and
  cause a presentation of the changed page state of the browser based on the updated browser history stack, wherein to cause the presentation of the changed page state of the browser, the processor is to:
    parse, by the component within the browser, a token from an entry at the top of the browser history stack into a plurality of dynamic segments;
    generate, by the component within the browser, a map based at least in part on the plurality of parsed dynamic segments, wherein the map is generated based on a structure of browser-based application code without executing the browser-based application code and is not specific to the type of the browser-based application code, and wherein to generate the map the processor is to:
      access a data structure having a plurality of predefined dynamic segment types and corresponding priorities indicating an order of execution for blocks of browser-based application code; and
      map the plurality of parsed dynamic segments using the plurality of predefined dynamic segment types and the corresponding priorities, to define the order of execution for the blocks of the browser-based application code; and
    execute, by the browser, the blocks of the browser-based application code based at least in part on the map to cause the presentation of the changed page state of the browser in view of the updated browser history stack.

12. The non-transitory computer readable medium claim 11, wherein the instructions to update the browser history stack further cause the processor to perform one or more of:
  push a new entry to the top of the browser history stack; or
  pull an existing entry to the top of the browser history stack.

13. The non-transitory computer readable medium of claim 11, wherein the instructions to parse the token from the entry further cause the processor to parse the token from an entry comprising a uniform resource locator and the token.

14. The non-transitory computer readable medium of claim 11, wherein the instructions to update the browser history stack based at least in part on the navigation request further cause the processor to push an entry to the top of the browser history stack, the entry comprising a token identical to a string path included in the navigation request.

15. The non-transitory computer readable medium of claim 11, wherein the priorities are based at least in part on the structure of the browser-based application code.

* * * * *